April 4, 1933.  B. E. HORNE  1,903,338

PRESSURE REGULATING AND RELIEF VALVE

Filed April 3, 1929  2 Sheets-Sheet 1

INVENTOR.
Burchard E. Horne
BY
Gardner ??
ATTORNEY.

April 4, 1933. B. E. HORNE 1,903,338
PRESSURE REGULATING AND RELIEF VALVE
Filed April 3, 1929  2 Sheets-Sheet 2

INVENTOR.
Burbank E. Horne
BY
Gardner W. Pearson
ATTORNEY.

Patented Apr. 4, 1933

1,903,338

UNITED STATES PATENT OFFICE

BURCHARD E. HORNE, OF ANDOVER, MASSACHUSETTS

PRESSURE REGULATING AND RELIEF VALVE

Application filed April 3, 1929. Serial No. 352,289.

This invention relates to valves of the pressure type.

Particularly in heating systems, it is often desirable that there should be a pressure reducing valve to reduce the normal pressure beyond the valve to a predetermined point, and also a pressure relief valve in case the pressure should rise beyond what might be considered a danger point.

There is also often used in connection with such pressure reducing and relief valves a strainer to strain the liquid or fluid.

The purpose of this invention is to combine in one housing or structure, a combination of pressure reducing and relief valve and preferably also the strainer.

My combination valve is useful on the water inlet of a hot water heating boiler and also on a main water inlet for any house having a running water system, particularly where the outside pressure is high.

Advantages of my device are its simplicity as it has very few moving parts and the moving parts act directly without connecting rods or other mechanism which is likely to get out of adjustment.

Moreover as there are only two valve seats which are substantially concentric and only one valve disc which engages either one or the other, or ordinarily neither, and as the liquid or fluid at all times when either valve is open sweeps in from all directions over the disc and over both valve seats, there is very little chance of dirt getting in to interfere with the action. My device is, therefore, substantially self-cleaning. By the use of a cylindrical valve chamber in which is a strainer, the flow is distributed entirely around and helps to keep clean all the contacting surfaces.

Besides this, my device is so assembled that the pressure regulating and relief springs and diaphragm can easily be adjusted from the outside.

Figure 1:
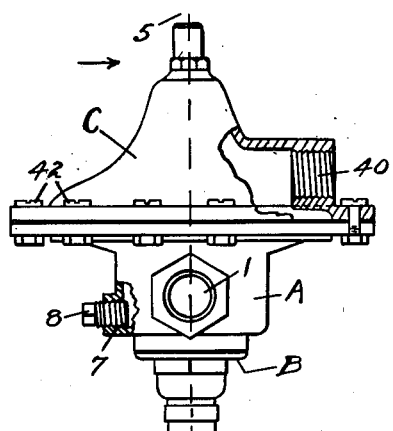
Fig. 1 is an elevation of my preferred type of valve.
Figure 2:
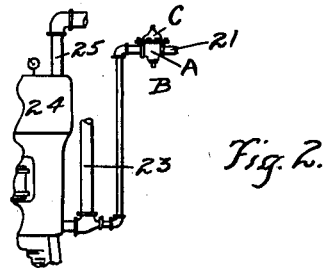
Fig. 2 is a detail showing my valve in position on a hot water heating boiler.

In Fig. 2 of the drawings, 21 represents a water supply pipe leading from the water main to a hot water boiler such as 24, having water supply pipe 25 and return pipe 23.

I will call my valve C A B and it serves the functions of a strainer, reducing valve and a pressure relief valve, all of which are very necessary.

Figure 3:
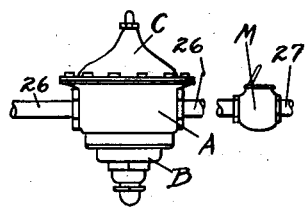
Fig. 3 shows my valve in position in a house water supply system.

In Fig. 3, I show a house water inlet 27 as from a street supply entering a meter M, and I interpose my valve C A B in the pipe 26 which leads from the meter to the house conveniences.

Where there is a very high outside pressure, as for instance 150 lbs., I can reduce this with my valve to perhaps 40 lbs. and also set the relief pressure spring at perhaps 60 lbs. so that while the water pressure in the house is kept at 40 lbs. if a water heater should become over-heated and the pressure in the house should be run up, it would be relieved at 60 lbs.

In the drawings, A represents the body of my valve shown as having an inlet 1 and outlet 2 and preferably between them and at the bottom, the plug hole 3 directly opposite which is control passage 4 from the control valve stem chamber 5 shown as being a dish shaped depression in the centre and top of the body.

From this control valve stem chamber 5 is an outlet passage 6 which connects with the main outlet 2.

10 represents what I will call the regulating valve chamber which connects with the plug hole 3, with the inlet 1 and with the control passage 4.

As shown, it has an annular recess 11 which with recess 31 in plug B form a strainer section in which strainer L is placed and around which is an enlarged annular flow section 100 which connects with the main fluid inlet 1.

Below and around the lower end of the control passage 4 is the fixed valve seat 14 directly in line with and opposite the plug hole 3.

B is a plug shown as threaded and screwed into the plug hole 3 thereby stopping it up and as having an annular strainer recess 31 which forms part of the strainer section, and also as having the tubular valve disc guide 30.

C represents a dome having the drain outlet 40 and is shown as being attached around its rim to the top of the body A, as by means of bolts 42, 42. It is shown as extending up in the middle in the form of a crown 43 through which is an adjusting screw hole 44 for the adjusting screw 45 which regulates the strength of the relief pressure control spring G.

Dome C may be regarded as part of the valve body and is convenient as it serves as a housing for control valve stem spring G and to hold a diaphragm such as D in place. It might perhaps be called a cage if drain outlet 40 was much enlarged.

Preferably I protect relief pressure spring adjusting screw 45 by a cap 145.

D is a diaphragm shown as held around its rim between the dome C and the body A and having the central opening 50 through which passes the tubular control valve stem F.

This stem F comprises the top member shown as being a plate 60 having a boss 61 with a threaded hole 62 into which is screwed the bottom member 65 said boss having the outlets 63, 63, and at the top having a stud 64 which is encircled by the pressure spring G which spring extends between it and the pressure spring adjusting screw 45.

The bottom member 65 of the valve stem F is tubular and has an outwardly extending collar 66 at the end of its threads 67 whereby when bottom member 65 is screwed into the top member 60, the diaphragm D is clamped between them. The bottom member 65 extends down loosely into the control passage 4 so that there is outside of tube 65, an annular space 114 through which fluid can pass from main inlet 1 to the control valve stem chamber 5 and thence through the valve chamber outlet passage 6 into the main outlet 2 when the valve disc H is not seated on fixed valve seat 14.

Figure 5:
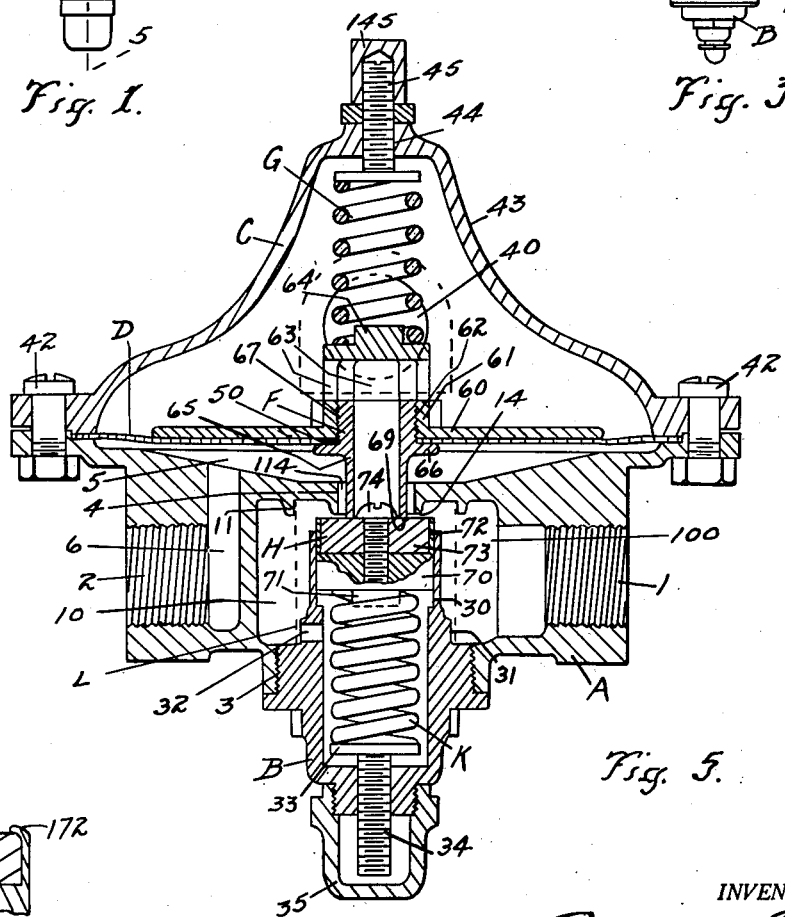
Fig. 5 is a vertical section in the line 5—5 of Fig. 1 looking from the right in the direction of the arrow. This view is enlarged.
Figure 6:
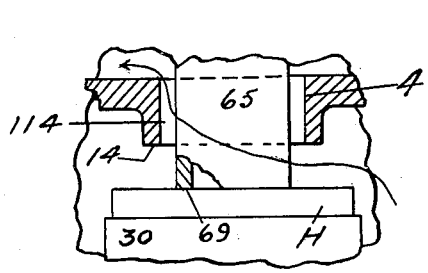
Fig. 6 is a detail showing another position of the disc.

The annular end 69 of tube 65 forms a movable valve seat which, as shown in Figs. 5 and 6, at times engages disc H and thereby prevents any liquid from passing up through tube 65 and out drain outlet 40.

The normal adjustment of the parts is as shown in Fig. 5 with disc H engaging its movable valve seat 69 but out of engagement with its fixed seat 14.

The valve disc H is shown as comprising a metal cup 70 having at the bottom a stud 71 which enters spring K and a recess 72 for the fiber disc 73 which is held thereto by means of the disc screw 74.

Figure 4:
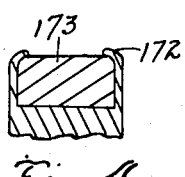
Fig. 4 is a detail showing a modification of the valve disc cup.

Disc screw 74 may be omitted if the top edge 172 of the cup is burred or turned to hold the disc 173 in place as shown in Fig. 4.

The disc seating spring K which should be adjusted to be weaker than pressure spring G tends to keep this disc H on its seats 14 and 69 while pressure spring G is set to normally force it away from its seat 14 to allow the flow of fluid from the main inlet 1 up through the chamber 5 through the main outlet 2.

L is a strainer of tubular form positioned in the strainer recesses 11 and 31 whereby the liquid which enters the inlet 1 must pass through it in order to get into the chamber, 5.

For reducing the pressure, the pressure spring G is adjusted so that it will overcome the disc seating spring K and force valve disc H away from its fixed seat 14.

When, however, high pressure fluid comes in through inlet 1 and presses against the lower part of the diaphragm D, which has a very much larger area than the control passage 4, the pressure of pressure spring G is overcome whereupon the tubular control valve stem F is carried up allowing the disc seating spring K to seat disc H or to force it towards its seat whereby the annular space 114 in the control passage 4 is obstructed and less liquid is permitted to pass through, thus reducing the pressure of what is discharged through the outlet passage 6. This actually results in valve disc H being held at about a certain distance from its fixed seat 14 so that there is no chattering and the reduced pressure is substantially stable.

Figure 7:
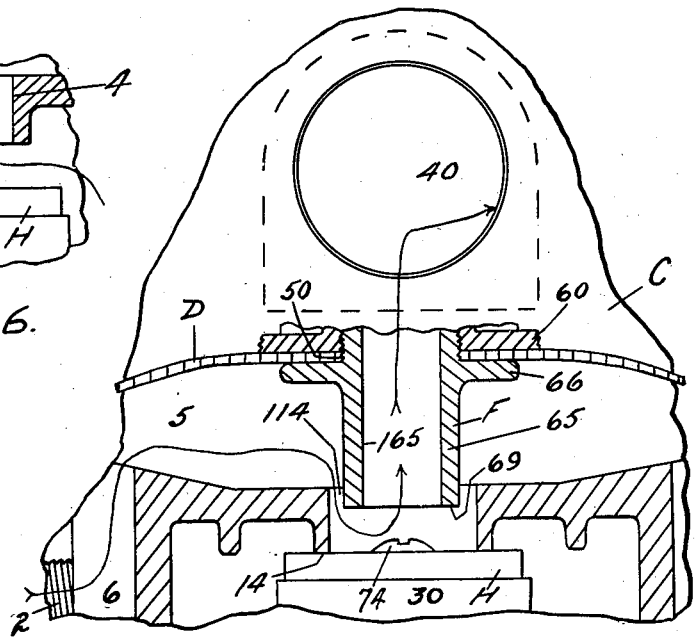
Fig. 7 is a vertical sectional view showing another position of the control valve stem and disc.

On the other hand, if for any reason the pressure is unduly increased whereby there is a back pressure through main outlet 2 and the outlet passage 6, this back pressure working on the bottom of the diaphragm D overcomes the pressure of spring G and forces it and diaphragm D into the position shown in Fig. 7, whereupon spring K seats disc H. The end 69 of tubular control valve stem F being a movable valve seat is now lifted away from the top of disc H, and the fluid is allowed to flow up through the central passage 165 of tube 65 and then out through the outlets 63, 63 thence out through the drain outlet 40 thereby relieving the excess of pressure.

At the same time, valve disc H rests on fixed valve seat 14 and stops the flow from inlet 1.

As there is nothing to hold it back, the high pressure fluid backing up from outlet 2 escapes quickly through drain 40 until the pressure is relieved.

To equalize the pressure and prevent the tubular guide 30 from filling with fluid and thus preventing the free action of the disc H, I prefer to provide a vent 32.

33 represents a plate having a boss between which boss and 71 the disc seating spring K extends.

34 is an adjusting screw by means of which the pressure of spring K can be regulated or changed, and 35 is a cap which protects screw 34.

I also prefer to provide a clean out hole 7 with a plug 8 whereby the control passage 10 can be reached without uncoupling any permanent pipes which may engage inlet 1 or outlet 2.

The pressure of spring K can be adjusted by means of screw 34 and of G by screw 45. By operating these screws, the relief pressure of spring G can be increased or decreased and the difference between the pressure of the two springs can be regulated whereby the opposing forces are more or less balanced and the normal or passive position of disc H with reference to fixed seat 14 is determined, and also the flow of fluid from inlet 1 to outlet 2 and therefore its pressure beyond outlet 2.

Figure 8:
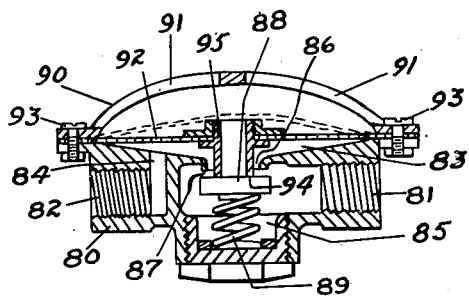
Fig. 8 is a vertical sectional view of a modified construction.

In Fig. 8 I show a simplified and modified construction in which the plug, adjusting screws, tubular guide for the disc, the strainer and the protecting caps are all omitted.

80 represents the body of my valve with an inlet 81 and outlet 82, control valve stem chamber 83, outlet 84 therefrom to main outlet 82, regulating valve chamber 85, control passage 86 and fixed valve seat 87.

88 is a valve disc and 89 a disc seating spring which is normally adapted to cause this disc to engage the fixed valve seat 87 or the movable valve seat 94 at the bottom end of the tubular valve stem 93 carried by diaphragm 92. Diaphragm 92 is held between the low cage 90 and body 80 as by means of the bolts 93.

91, 91 are drain outlets.

The spring 89 can be very weak as its only function is seating the valve when pressure is removed, and the elasticity of the diaphragm 92 may be great enough to overcome the pressure of spring 89. For regulating, a a stronger or weaker diaphragm can be used. Under excessive back pressure through outlet 82, diaphragm 90 has enough elasticity to yield to the dotted line position.

Figure 9:
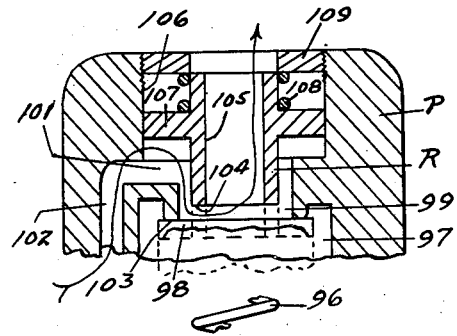
Fig. 9 is a vertical sectional detail view showing another modified construction.

As shown in Fig. 9, I may even entirely do away with the diaphragm using in place thereof a movable valve stem having a relatively large projecting collar.

In Fig. 9, P is the valve casing in which is a regulating valve chamber 97 in which is vertically movable a valve disc 98 similar to H or 88 and a valve seating spring 96 which tends to seat disc 98 on the fixed valve seat 103. 99 is the control passage and R is a tubular valve stem similar to F and to 93 except that it combines the function of valve stem and a diaphragm.

Stem R has a projecting collar or annular rib 107 which allows it to slide easily in the cylindrical control valve stem chamber or passage 106, and also has the vertical hole 105 which extends from the lower end inside the movable seat 104 entirely through stem R and serves as a relief pressure passage. Collar 107 serves about the same purpose as a diaphragm.

109 is a tubular plug screwed into the top of passage 106 and between it and collar 107 is a pressure spring 108 which corresponds with G.

As shown, if the back pressure through outlet 102 and passage 101 against collar 107 is sufficient, it will lift R allowing disc 98 to be seated on fixed seat 103 and allowing the over-pressure fluid to run out through passage 105 and to escape at the top until the back pressure is reduced.

The diaphragm when used and the pressure spring may be regarded as accessories of the tubular control valve stem.

In the claims, the control valve stem chamber refers to 5, 83 and 106, the control passage to 4, 86 and 99, and the regulating valve chamber to 10, 85 and 97, while the diaphragm such as D, or 92 and annular flange 107 are all included in the words closure means.

I claim:

1. In a pressure regulating and relief valve, the combination of a body having at its top a control valve stem chamber from which extends an outlet passage and a centrally disposed control passage to a regulating valve chamber including a strainer section and an enlarged flow section around it, a main fluid inlet, a fixed valve seat below and around the control passage and a plug hole opposite thereto; with a plug which engages and stops up the plug hole, said plug having an annular strainer recess and a tubular valve disc guide; a dome having a drain outlet, said dome being attached to the top of said body; a diaphragm held at its rim between the dome and body; a movable tubular control valve stem centrally fixed to the diaphragm and which at one end forms a movable valve seat concentric with the fixed valve seat and extends loosely into the control passage and has at its other end an outlet into the dome above the diaphragm; a relief pressure spring; a valve disc slidable in the disc guide and adapted to engage both valve seats; a disc seating spring adapted to cause the disc to engage the nearest one of the valve seats; means to adjust the strength of the relief pressure spring; and means to adjust the pressure of the disc seating spring.

2. In a pressure regulating and relief valve, the combination of a body having at its top a control valve stem chamber from which extends an outlet passage and a centrally disposed control passage to a regulating valve chamber including a strainer section and an enlarged flow section around it, a main fluid inlet, a fixed valve seat below and around the control passage and a plug hole opposite thereto; with a plug which engages and stops up the plug hole, said plug having an annular strainer recess and a tubular valve disc guide; a dome having a drain outlet, said dome being attached to the top of said body; a diaphragm held at its rim between the dome and body; a movable tubular control valve stem centrally fixed to the diaphragm and which at one end forms a movable valve seat concentric with the fixed valve seat and extends loosely into the control passage and has at its other end an outlet into the dome above the diaphragm; a relief pressure spring; a valve disc slidable in the disc guide and adapted to engage both valve seats; and a disc seating spring adapted to cause the disc to engage the nearest one of the valve seats.

3. In a pressure regulating and relief valve, the combination of a body having at its top a control valve stem chamber from which extends an outlet passage and a centrally disposed control passage to a regulating valve chamber, a main fluid inlet, a fixed valve seat below and around the control passage and a plug hole opposite thereto; with a plug which engages and stops up the plug hole, said plug having a valve disc guide; a dome having a drain outlet, said dome being attached to the top of said body; a diaphragm held at its rim between the dome and body; a movable tubular control valve stem centrally fixed to the diaphragm and which at one end forms a movable valve seat concentric with the fixed valve seat and extends loosely into the control passage and has at its other end an outlet into the dome above the diaphragm; a pressure control spring; a valve disc adapted to engage both valve seats; and a disc seating spring adapted to cause the disc to engage the nearest one of the valve seats.

4. In a pressure regulating and relief valve, the combination of a body having at its top a control valve stem chamber from which extends an outlet passage and a centrally disposed control passage to a regulating valve chamber, a main fluid inlet, a fixed valve seat below and around the control passage; a dome having a drain outlet, said dome being attached to the top of said body; a diaphragm held at its rim between the dome and body; a movable tubular control valve stem centrally fixed to the diaphragm and which at one end forms a movable valve seat concentric with the fixed valve seat and extends loosely into the control passage and has at its other end an outlet into the dome above the diaphram; a pressure control spring; a valve disc adapted to engage both valve seats; and a disc seating spring adapted to cause the disc to engage the nearest one of the valve seats.

5. In a pressure regulating and relief valve, the combination of a body having a control valve stem chamber from which extends an outlet passage and a centrally disposed control passage to a regulating valve chamber, a main fluid inlet, and a fixed valve seat below and around the control passage; a tubular control valve stem freely movable in said control passage and extending up through and movable with closure means for the control valve stem chamber located beyond the outlet passage, such stem having a movable valve seat concentric with the fixed valve seat inside and spaced from the fixed valve seat; a valve disc adapted to engage both valve seats; a disc seating spring adapted to cause the disc to engage the nearest one of the valve seats; and means to exert pressure on the tubular valve stem sufficient to normally cause it to unseat said disc from the fixed valve seat.

6. In a pressure regulating and relief valve, the combination of a body having a control valve stem chamber from which extends an outlet passage and a centrally disposed control passage to a regulating valve chamber, a main fluid inlet, and a fixed valve seat below and around the control passage; a tubular control valve stem freely movable in said control passage and extending up through and movable with closure means for the control valve stem chamber located beyond the outlet passage; such stem having a movable valve seat concentric with the fixed valve seat inside and spaced from the fixed valve seat; a valve disc adapted to engage both valve seats; adjustable spring means to cause the disc to engage the nearest one of the valve seats; and adjustable pressure means to exert pressure on the tubular valve stem in the opposite direction from the last named means.

BURCHARD E. HORNE.